(12) United States Patent
Perumalla et al.

(10) Patent No.: US 12,737,993 B2
(45) Date of Patent: Sep. 15, 2026

(54) DEPLOYING VIRTUAL ASSISTANCE IN AUGMENTED REALITY ENVIRONMENTS

(71) Applicant: International Business Machines Corporation, Armonk, NY (US)

(72) Inventors: Saraswathi Sailaja Perumalla, Visakhapatnam (IN); Sarbajit K. Rakshit, Kolkata (IN); Ballary Javid Hussain, Anantapur (IN)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 18/184,020

(22) Filed: Mar. 15, 2023

(65) Prior Publication Data

US 2024/0312144 A1 Sep. 19, 2024

(51) Int. Cl.

| | |
|---|---|
| ***G06T 19/00*** | (2011.01) |
| ***G06F 3/01*** | (2006.01) |
| ***G06F 9/451*** | (2018.01) |
| ***G06Q 50/26*** | (2012.01) |
| ***G06V 20/54*** | (2022.01) |
| ***H04N 7/18*** | (2006.01) |

(52) U.S. Cl.

CPC ............ *G06T 19/006* (2013.01); *G06F 3/017* (2013.01); *G06F 9/453* (2018.02); *G06Q 50/265* (2013.01); *G06V 20/54* (2022.01); *H04N 7/181* (2013.01)

(58) Field of Classification Search

CPC .... G06Q 50/265; G06T 19/006; G06V 20/54; G06V 20/20; G06F 9/453; G06F 3/017; H04N 7/181

See application file for complete search history.

(56) References Cited

U.S. PATENT DOCUMENTS

| | | | | |
|---|---|---|---|---|
| 7,116,326 | B2 | 10/2006 | Soulchin | |
| 10,896,598 | B1 * | 1/2021 | Boss | H04W 4/90 |
| 2012/0215383 | A1 * | 8/2012 | Yoon | H04N 7/18 701/2 |
| 2018/0001869 | A1 | 1/2018 | Ur | |
| 2018/0018869 | A1 | 1/2018 | Ahmad et al. | |

(Continued)

FOREIGN PATENT DOCUMENTS

| | | | |
|---|---|---|---|
| CN | 1737578 | A | 2/2006 |
| CN | 106297338 | A | 1/2017 |

(Continued)

OTHER PUBLICATIONS

"Dynamic Traffic Management using Augmented Reality", An IP.com Prior Art Database Technical Disclosure, IP.com No. IPCOM000265371D, IP.com Electronic Publication Date: Apr. 2, 2021, 5 pages, <https://priorart.ip.com/IPCOM/000265371>.

(Continued)

*Primary Examiner* — Phi Hoang
(74) *Attorney, Agent, or Firm* — Andre L. Adkins

(57) ABSTRACT

Techniques are described with respect to a system, method, and computer product for generating virtual assistance. An associated method includes generating virtual assistance includes receiving a plurality of sensor data associated with a surveillance system; generating a virtual environment based on an analysis of the plurality of sensor data; and inserting an augmented reality-based assistance agent associated with an authority communicatively coupled to the surveillance system into the virtual environment.

20 Claims, 7 Drawing Sheets

(56) References Cited

U.S. PATENT DOCUMENTS

| | | | | |
|---|---|---|---|---|
| 2019/0376792 | A1* | 12/2019 | Chen | G01C 21/3647 |
| 2021/0375462 | A1* | 12/2021 | Rayos | A61B 5/0022 |
| 2022/0254161 | A1* | 8/2022 | Tatrai | G06V 20/53 |
| 2023/0070895 | A1* | 3/2023 | Seguin | G16H 10/60 |
| 2023/0205204 | A1* | 6/2023 | Laluque | B64U 10/00<br>701/3 |
| 2023/0360402 | A1* | 11/2023 | Szuba | G06V 10/7747 |

FOREIGN PATENT DOCUMENTS

| | | |
|---|---|---|
| CN | 108108018 A | 6/2018 |
| CN | 115242853 A | 10/2022 |

OTHER PUBLICATIONS

"Method and System for Using Autonomous Vehicles as Smart City Security", An IP.com Prior Art Database Technical Disclosure, IP.com No. IPCOM000270488D, IP.com Electronic Publication Date: Jul. 11, 2022, 4 pages, <https://priorart.ip.com/IPCOM/00270488D>.

Bang et al., "AR/VR Based Smart Policing for Fast Response to Crimes in Safe City", Proceedings of the 2019 IEEE International Symposium on Mixed and Augmented Reality Adjunct (ISMAR-Adjunct), Oct. 10-18, 2019, Beijing, China, 6 pages.

Vleugels, Anouk, "Police can remotely drive your stolen Tesla into custody", The Next Web, Nov. 19, 2018, 8 pages, <https://thenextweb.com/news/police-control-your-self-driving-cars>.

* cited by examiner

DEPLOYING VIRTUAL ASSISTANCE IN AUGMENTED REALITY ENVIRONMENTS

FIELD

This disclosure relates generally to computing systems and augmented reality, and more particularly to computing systems, computer-implemented methods, and computer program products configured to utilize various data to generate augmented reality environments and incorporate holographic and three-dimensional displays for virtual assistance within the augmented reality environments.

BACKGROUND

Augmented reality (AR) is an interactive experience combining virtual elements, with a real world environment where the objects that reside in the real world are enhanced by computer-generated perceptual information. These virtual elements include 360 degree video that creates a three-dimensional image of an object, and other volumetric displays designed to form a visual representation of the object in three dimensions.

Automotive and pedestrian-based traffic flow and other public-related happenings are generally analyzed based on compliance with rules, regulations, and ordinances designed to provide safety for motorists, pedestrians, and citizens. In instances in which law enforcement and/or emergency medical services (e.g., paramedics, physicians, etc.) are desired or required, the factor of time and the presence of the aforementioned entities showing up at the location of an incident can dictate not only the results of a rule, regulation, or ordinance being violated, but more importantly damages sustained as a direct consequence of the violation. For example, a car accident not only has a direct impact on the motorist involved, but also the flow of traffic due to resulting traffic congestion, detours, etc.

Furthermore, autonomous vehicles may operate with little to no human controlling. The ability to sense the surrounding environment and utilize various technologies such as sonar, radar, global positioning, lidar, virtual displays, etc. allow the real world environment to have virtual elements integrated in a manner that optimizes the passenger experience.

SUMMARY

Additional aspects and/or advantages will be set forth in part in the description which follows and, in part, will be apparent from the description, or may be learned by practice of the invention.

Embodiments relate to a method, system, and computer readable medium for generating virtual assistance. In some embodiments, the computer-implemented method for generating virtual assistance includes receiving a plurality of sensor data associated with a surveillance system; generating a virtual environment based on an analysis of the plurality of sensor data; and inserting an augmented reality-based assistance agent associated with an authority communicatively coupled to the surveillance system into the virtual environment.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
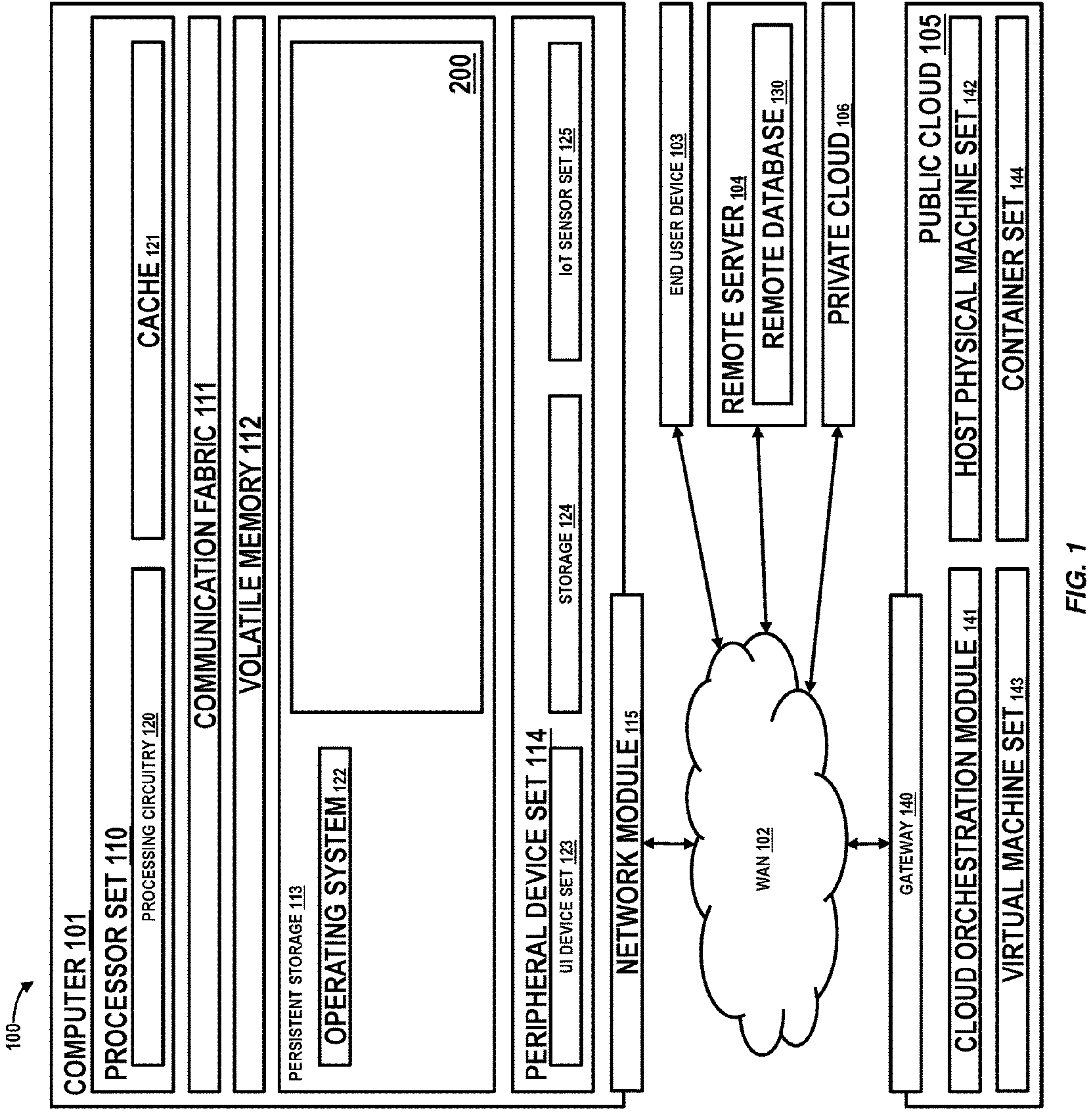
FIG. 1 illustrates a networked computer environment, according to an exemplary embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method.

The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The following described exemplary embodiments provide a method, computer system, and computer program product for generating virtual assistance. Incidents within public spaces such as, but not limited to, car accidents, public hazards, infractions, violations of rules, regulations, ordinances, etc. frequently require the involvement of entities such as law enforcement, emergency responders, and the like. The amount of time required for the aforementioned entities to arrive at the scene of the incident may not only be subject to factors like the amount of traffic, availability of applicable entity personnel, etc. but more importantly determine the consequences such as the amount of damages sustained by individuals associated with the incident. Volumetric display and other applicable display technologies provide the ability to integrate three-dimensional objects into both physical and virtual environments. In light of the fact that computer-mediated reality technology incorporating visual, auditory, and other forms of sensory feedback has become increasing popular, mechanisms such as robotics, autonomous vehicles, and the like have begun to integrate functionality that allows for three-dimensional objects to be superimposed via digital overlays in display interfaces providing altered views of real-world environments. The present invention allows for the creation of virtual environments based on various sources of data including, but not limited to, sensor systems, close circuit television (CCTV) imagery, road traffic data, and other data inputs. Furthermore, the present invention provides integration of virtual assistance agents associated with the aforementioned entities within virtual environments allowing the agents to not only assist pedestrians and motorists at the scene of the incident in real-time, but also provide gestures and other applicable instructions which trigger execution of one or more actions at the applicable autonomous vehicles. Thus, the present embodiments have the capacity to improve monitoring, maintaining, and securing of the general public by deploying virtual assistance agents at location sites of incidents and/or potential incidents allowing law enforcement officers and/or medical professionals to be virtually present at the location sites and patrol and/or assist remotely.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As described herein, virtual reality ("VR") refers to a computing environment configured to support computer-generated objects and computer mediated reality incorporating visual, auditory, and other forms of sensory feedback. It should be noted that a VR environment may be provided by any applicable computing device(s) configured to support a VR, augmented reality, and/or mixed reality user interacting with their surroundings, said interactions including but not limited to user movement/gazing, manipulation of virtual and non-virtual objects, or any other applicable interactions between users and computing devices known to those of ordinary skill in the art.

As described herein, augmented reality is technology that enables enhancement of user perception of a real-world environment through superimposition of a digital overlay in a display interface providing a view of such environment. Augmented reality enables display of digital elements to highlight or otherwise annotate specific features of the physical world based upon data collection and analysis. For instance, augmented reality can provide respective visualizations of various layers of information relevant to displayed real-world scenes.

As described herein, an "incident" is an existing or potential event or occurrence that requires the assistance and/or presence of a law enforcement officer, firefighter, medical professional, robotic system or any other applicable civil servants. Examples of incidents include, but are not limited to car accidents, public hazards, infractions, occurrences including a high probability of accident/injury/violence, occurrences indicating a presence of required assistance, violations of rules, regulations, ordinances, etc.

As described herein, an "assistance agent" is an avatar, hologram, volumetric-based object, tomographic reconstruction, or any other applicable virtual visual depiction configured to represent the applicable civil servant or medical professional within the virtual and/or physical environment in which the augmented reality-based assistance agent is controlled by the applicable law enforcement and/or emergency medical services communicatively coupled to the platform providing the virtual environment. In some embodiments, the assistance agent is one or more robots configured to assist at the scene of an incident.

It is further understood that although this disclosure includes a detailed description on cloud-computing, implementation of the teachings recited herein are not limited to a cloud-computing environment. Rather, embodiments of the present invention are capable of being implemented in conjunction with any other type of computing environment now known or later developed.

The following described exemplary embodiments provide a system, method and computer program for generating virtual assistance. Referring now to FIG. 1, a computing environment 100 contains an example of an environment for the execution of at least some of the computer code involved in performing the inventive methods, such as block 200. In addition to block 200, computing environment 100 contains an example of an environment for the execution of at least some of the computer code involved in performing the inventive methods. Computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, computer-mediated reality device (e.g., AR/VR headsets, AR/VR goggles, AR/VR glasses, etc.), mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) payment device), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD payment device. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter payment device or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
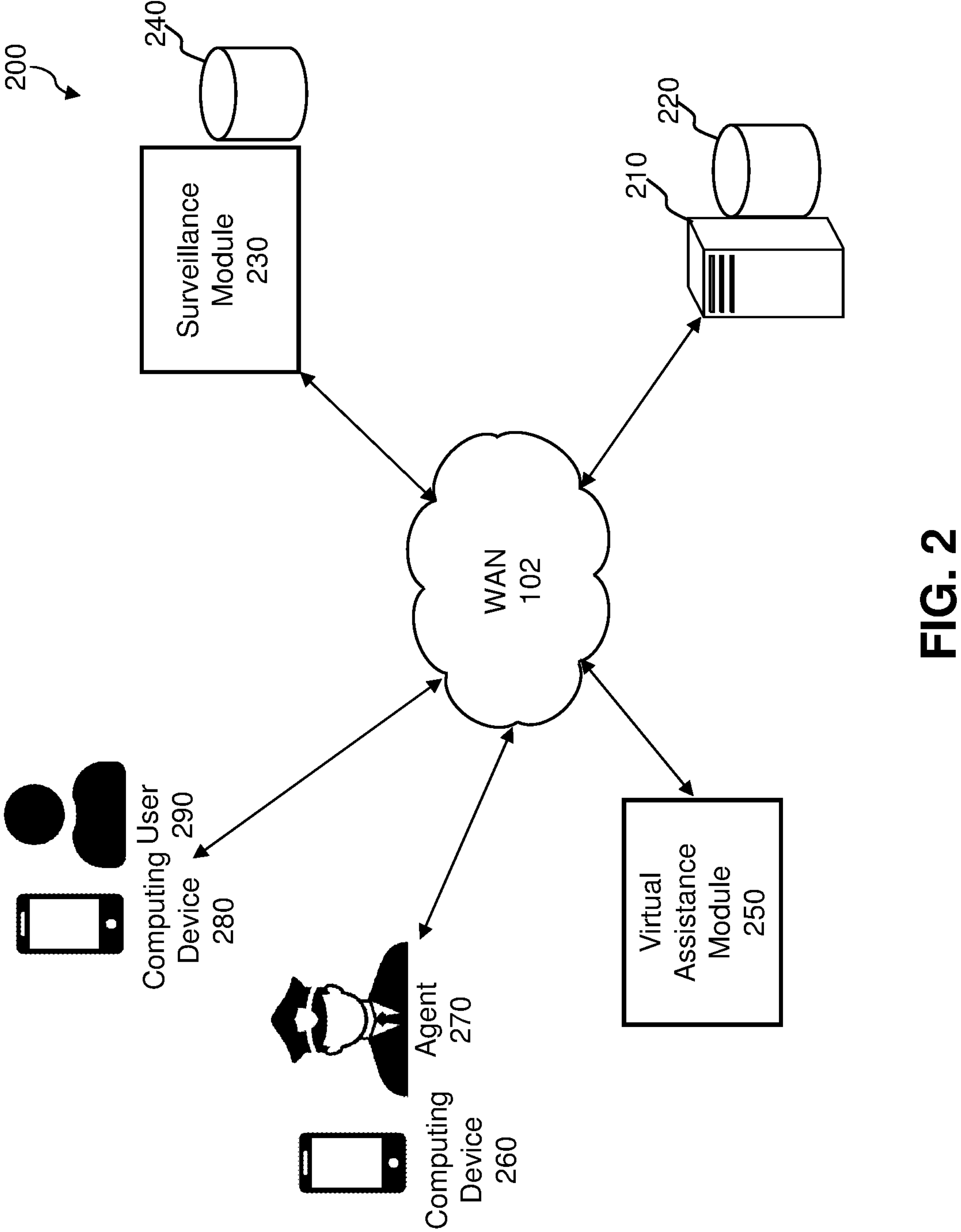
FIG. 2 illustrates a block diagram of a virtual assistance system environment, according to an exemplary embodiment.

Referring now to FIG. 2, a functional block diagram of a networked computer environment illustrating a computing environment for a virtual assistance system 200 (hereinafter "system") comprising a server 210 communicatively coupled to a database 220, a surveillance module 230 comprising a surveillance module database 240, a virtual assistance module 250, a computing device 260 associated with an agent 270, and a computing device 280 associated with a user 290, each of which are communicatively coupled over WAN 102 (hereinafter "network") and data from the components of system 200 transmitted across the network is stored in database 220.

In some embodiments, server 210 is configured to operate a centralized platform serving as a cloud-based video processing system designed for user 290 to access via computing device 280 and/or and other applicable computing devices. In a preferred embodiment, the centralized platform is an augmented reality platform designed to depict virtual representations (hereinafter referred to as "virtual assistance") of agent 270 on computing device 280. User interfaces and application programming interfaces (APIs) of the centralized platform are provided by server 210 and an augmented reality environment is depicted based on data processed by surveillance module 230 and virtual assistance module 250. In a preferred embodiment, computing device 280 is configured to depict virtual assistance via volumetric displays, virtual/augmented reality displays, and/or any other applicable mechanism designed to depict three-dimensional objects known to those of ordinary skill in the art. The centralized platform is further designed to run on computing devices 260 and 280 allowing both agent 270 and user 290 to send data, input data, collect/receive data, etc. It should be noted that the centralized platform functions as a mechanism to connect agent 270 and user 290 at least by allowing user 290 to view virtual assistance. Server 210 further comprises one or more associated crawlers configured to ascertain information associated with applicable internet-based data sources to be stored in database 220. The internet-based data sources may include, but are not limited to social media platforms (e.g., data derived from posts, shares, etc.), crowd-sourcing data sources, weather data sources, traffic data sources, geographic/terrain data sources, highway infrastructure data sources, ad-hoc boundary network data sources, or any other applicable internet-based data sources known to those of ordinary skill in the art.

Surveillance module 230 is a surveillance system designed to use video surveillance technologies, such as but not limited to closed-circuit television (CCTV), image detection/analyses systems, computer visioning systems, and other applicable monitoring systems to collect data, such as sensor data, associated with public spaces in addition to identify pedestrians, motorists, civilians, etc. in need of assistance. Surveillance module 230 further collects various sensor data and data feeds, such as but not limited to vehicle-to-vehicle data ("V2V"), GPS/location data, routes, identifiers, etc. Surveillance module 230 is further configured to collect contextual information in the form of viewpoint data derived from computing device 260 and/or analyses of incident/traffic and police reports associated with geographic areas, road infrastructure data, bystander opinions and observation data (e.g., linguistic inputs, etc.), and any other applicable data configured to support ascertaining contextual information associated with incidents. Current, past, and forecasted/predicted data associated with data derived from the aforementioned monitoring systems is stored in surveillance module database 240 and may be transmitted to virtual assistance module 250 over the network. It should be noted that surveillance module 230 collects video/data feeds from various directions resulting in volumetric video of the entire traffic ecosystem of a geographic area in order to properly detect and map incidents within the geographic area. The volumetric video derived from video/data feeds is further configured to account for other applicable volumetric studio-based elements such as multi-image sensor data, audio-recording device data, lighting systems, etc. In some embodiments, surveillance module 230 is tasked with assigning location identifiers for the geographic area based on the source of the data/video feed (i.e., which particular CCTV system a particular video feed is sourced from).

Virtual assistance module 250 is not only configured to perform supervised and unsupervised learning techniques on sensor data, data feeds, and other applicable data collected by surveillance module 230 in order to process and analyze various components of the aforementioned data, but also tasked with seamlessly interweaving virtual assistance into the physical world such that it is perceived as an immersive aspect of the real environment. It should be noted that virtual assistance is a virtual representation of agent 270 operating on computing device 260 in which the gestures, actions, instructions, etc. of agent 270 are manifested within the virtual environment depicted via computing device 280. Outputs of applicable machine learning models operated by virtual assistance module 250 are configured to be stored in one or more database of surveillance module 230 and accessed by surveillance module 230 in order to optimize the virtual environments rendered by virtual assistance module 250. Thus, virtual assistance module 250 depicts real-world representations of an augmented reality processing environment of the scene of the incident resulting in agent 270 receiving the virtual environment, and ultimately agent 270 integrating virtual representations of themselves with the virtual environment for viewing by user 290.

Computing device 260 and 280 may take the form of a desktop computer, laptop computer, tablet computer, smart phone, smart watch or other wearable computer, mainframe computer, computer-mediated reality (CMR) device/VR device, quantum computer or any other form of computer or mobile device now known or to be developed in the future that is capable of running a program, accessing a network or querying a database. In some embodiments, computing device 280 is a component of an autonomous vehicle supporting virtual environments and holographic and/or volumetric displays to be presented within the virtual environments on applicable displays of the virtual environment. In some embodiments, surveillance module 230, virtual assistance module 250, and computing device 260 cooperate to accomplish the goal of capturing concurrent, multiple perspectives of the geographic area being monitored. For example, the potential perspective of agent 270 within the geographic area may be established by the aforementioned based on factors such as, but not limited to location, gaze direction, distance from incident, sensed environment, etc.

Figure 3:
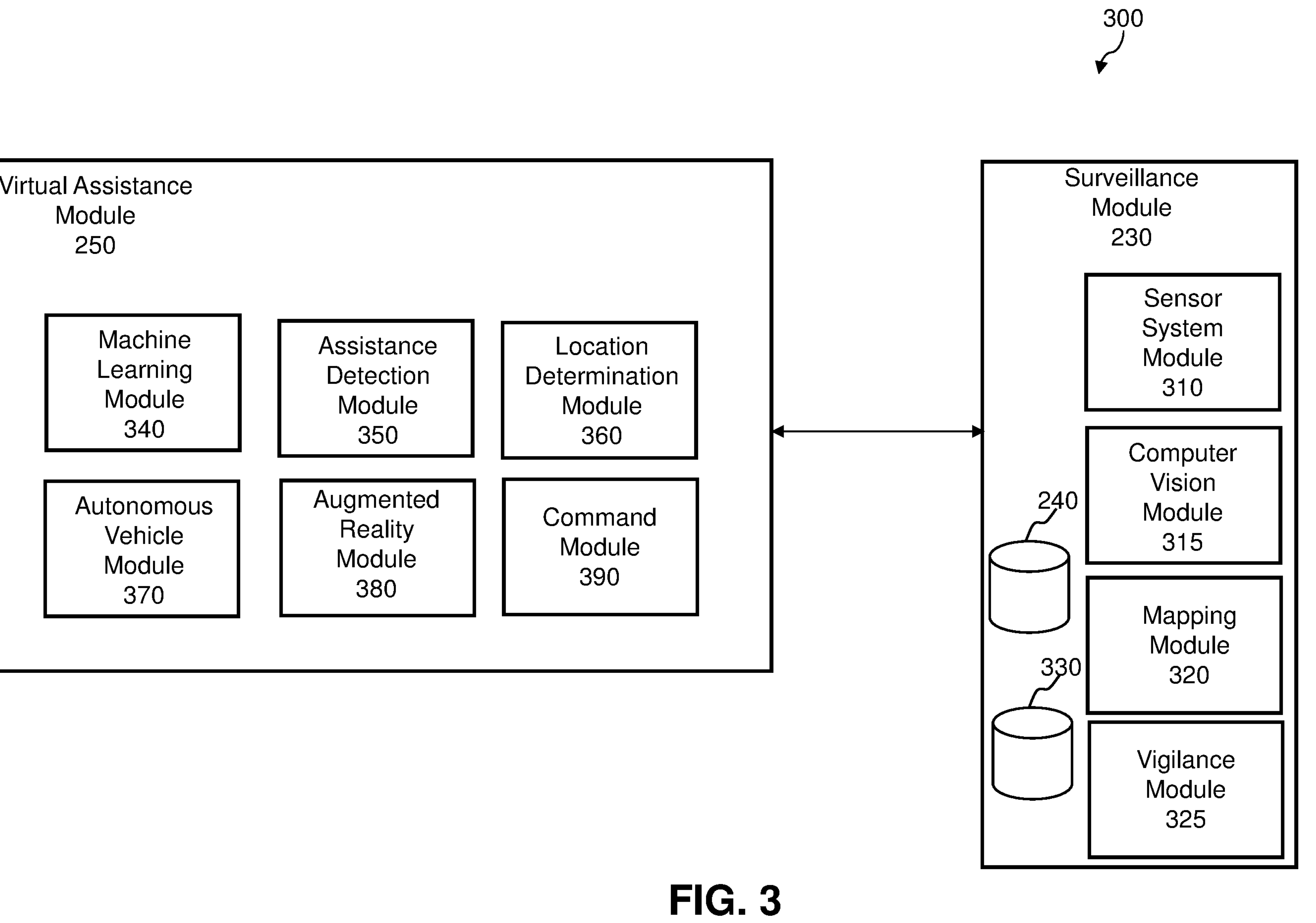
FIG. 3 illustrates a surveillance module and a virtual assistance module associated with the system of FIG. 1, according to an exemplary embodiment.

Referring now to FIG. 3, an example architecture 300 of surveillance module 230 and virtual assistance module 250 is depicted, according to an exemplary embodiment. In some embodiments, surveillance module 230 comprises a sensor system module 310, a computer vision module 315, a mapping module 320, a vigilance module 325, and a mapping module database 330. In some embodiments, virtual assistance module 250 comprises a machine learning module 340, an assistance detection module 350, a location determination module 360, an autonomous vehicle module 370, an augmented reality module 380, and a command module 390.

Sensor system module 310 is a collection of one or more sensor systems of surveillance module 230 designed to collect sensor data for the purpose of analyzing and mapping the geographic area surveillance module 230 is monitoring. The one or more sensor systems may include, but are not limited to, cameras, microphones, position sensors, gyroscopes, accelerometers, pressure sensors, cameras, microphones, temperature sensors, biological-based sensors (e.g., heartrate, biometric signals, etc.), a bar code scanner, an RFID scanner, an infrared camera, a forward-looking infrared (FLIR) camera for heat detection, a time-of-flight camera for measuring distance, a radar sensor, a LiDAR sensor, a temperature sensor, a humidity sensor, a motion sensor, internet-of-things ("IOT") sensors, or any other applicable type of sensors known to those of ordinary skill in the art. In a preferred embodiment, sensor system module 310 includes one or more of a CCTV camera system, an unmanned aerial vehicle-based sensor system, geo-stationary satellite systems, a crowdsourcing-based system (e.g., sensor data derived from wearable device or any other applicable computing device). The CCTV camera system may be a plurality of cameras distributed among the geographic area configured to receive video feeds within a geo-location based range, in which each of the cameras are assigned a location identifier indicating the location of the incident with the geographic area in which the presence of agent 270 may be required.

Computer vision module 315 is configured to utilize algorithms or techniques that identify and process objects in images and videos derived from sensor data collected by sensor system module 310. In particular, computer vision module 315 receives computer vision data including images and videos from one or more of server 210, sensor system module 310, or any other applicable sources for images and videos associated with the geographic area being monitored. Computer vision trains computers to interpret and understand the received data such as digital image and/or video content, and can include techniques such as machine learning and/or use of machine learning models such as deep learning models (provided by machine learning module 340) to accurately identify and/or classify objects, and in some instances establish spatial information such as, but not limited to, area, width, volume, shape, location, size, and the like of elements captured within the collected sensor data. Sensor system module 310 may collect the location and applicable parties of an incident occurring within the monitored geographic area, in which computer vision module 315 may utilize one or more computer vision models designed to generate outputs pertaining to the incident(s) (e.g., identified parties, bystanders, specific objects, behaviors, metadata thereof, etc.) and store profiles associated with elements of incidents within surveillance module database 240. For example, computer vision module 315 may detect a driver involved in a car crash within one of the video/data feeds allowing server 210 to generate a profile associated with the driver, incident, geographic location based on the location identifiers, etc. Additionally in this example, computer vision module 315 may ascertain the make and model of the vehicles involved in the incident, and any other applicable information designed to be ascertained by computer visioning algorithms and techniques.

Mapping module 320 is tasked with mapping sensor data and outputs of analyses of sensor data to the geographic location monitored by surveillance module 230. Mapping functions performed by mapping module 320 may be based on one or more of data provided server 210 (e.g., contextual information, knowledge graphs, etc.), previously rendered maps of the geographic location, outputs of one or more machine learning models operated by machine learning module 340, inputs of agent 270 on user interfaces of the centralized platform, applicable data provided by relevant third parties (e.g., law enforcement entities, weather entities, traffic data entities, etc.), etc. Live video feeds, associated metadata (e.g., location identifier, time of capture, metatags, etc.), and any subsets of video files are collected and stored in mapping module database 330 for analysis, in which analysis may include one or more of video recognition, image/video analysis, or any other applicable mechanisms used to automatically detect objects of interest, persons of interest, and behavior of interest in real-time known to those of ordinary skill in the art. It should be noted that an important role of mapping module 320 is to prepare data necessary for the rendering of a three-dimensional virtual environment of the monitored geographic area by augmented reality module 380, in which the mappings performed may be supported by one or more cognitive systems accounting for a map of a geographic area including one or more incidents/prospective incidents; a knowledge of historical incidents (e.g., an event that may carry an attendant risk to one or more persons or property or compromise the security, safety, health, and/or physical/emotional welfare/well-being of one or more person/organizations); high risk/propensity targets (e.g., intersections, blind corner road, etc.); etc., each of which may be received from one or more sensors, cameras, IoT devices, and/or machine learning operations such as, for example, global positioning satellite ("GPS") data/measurements, one or more closed circuit television ("CCTV") cameras, natural language processing (NLP) performed on the data, etc.

Vigilance module 325 is a system providing representation of the communicative coupling of one or more applicable law enforcement and/or patrolling entities configured to prevent, mitigate, and assist the general public in the case of incidents. Violation and/or potential violation of incidents may be subject to a plurality of rules defined by the applicable law enforcement entities. Surveillance module 230 allows vigilance module 325 to receive the footage captured by sensor system module 310 in order for one or more representatives of vigilance module 325 to determine if involvement with the incident and/or prospective incident is necessary. It should be noted that agent 270 is a representative of the applicable law enforcement and/or patrolling entities associated with vigilance module 325, and agent 270 is able to interact with surveillance module 230 and virtual assistance module 250 via computing device 260 over the centralized platform allowing agent 270 to be virtually integrated into virtual environments generated based on sensor data collected by sensor system module 310. However in some embodiments, agent 270 is one or more autonomous robots configured to assist at the scene of an incident in which vigilance module 325 deploys the one or more autonomous robots based upon determinations rendered by assistance detection module 350. Vigilance module 325 may utilize cognitive systems to detect and learn behavior of one or more detected entities within footage from selections made by agent 270 via the centralized platform, historical activities of the video feeds based on location identifiers, etc., in which the learned behaviors include but are not limited to mobility patterns, classification of infrastructures (e.g., park, shopping center, government building, etc.), time of day, vehicle types (e.g., autonomous vehicle, motorcycle, rented car), etc. In some embodiments, vigilance module 325 communicates with mapping module 320 allowing vigilance module 325 to assign propensity thresholds to entities and areas within the captured footage of the video feeds, in which the propensity thresholds may be correlated to the location identifier associated with the CCTV system the applicable video feed is derived from. For example, a specific intersection known for its propensity and highly likelihood of accident is detected by vigilance module 325 and assigned a propensity threshold in which if the propensity threshold is exceeded based on the current footage captured within the video feed, then vigilance module 325 notifies the applicable law enforcement and/or emergency medical entity that attention and/or assistance is warranted.

Machine learning module 340 is configured to use one or more heuristics and/or machine learning models for performing one or more of the various aspects as described herein (including, in various embodiments, the natural language processing or image analysis discussed herein). In some embodiments, the machine learning models may be implemented using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting, and any other applicable machine learning algorithms known to those of ordinary skill in the art. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. In particular, machine learning module 340 is configured to operate and maintain one or more machine learning models configured to utilized training datasets derived from server 210, surveillance module 230, and/or virtual assistance module 250 in order to ultimately generated outputs of the machine learning models representing predictions of incidents and instances in which involvement of agent 270 is necessary.

Surveillance module 230 can receive external search requests or data to use during analysis of the video signals received from sensor system module 310. In particular, vigilance module 325 may execute search requests allowing the applicable law enforcement entity to access the footage of a geographic area in compliance with the applicable regulations. While vigilance module 325 is designed to allow the applicable law enforcement entity to detect incidents within the footage, machine learning module 340 is also configured to maintain one or more machine learning models designed to generate outputs reflecting predictions relating to behaviors of entities detected within the footage of the data feeds. In some embodiments, the predictions are based on various factors including, but not limited to, the behavior of an entity, in relation to an incident, identified contextual factors within the footage, geographical data, current data, historical data, weather data, traffic-related data, a learned propensity level model, etc.

Assistance detection module 350 is tasked with utilizing cognitive/analytic systems, image/video detection mechanisms, natural language processing (NLP), parsing functions, etc. in order to not only facilitate detection of incidents and prospective incidents, but also determine whether the presence of agent 270 is necessary. Data/video feeds acquired by surveillance module 230 are parsed by assistance detection module 350 for footage containing incidents and/or prospective incidents, wherein processing performed by assistance detection module 350 supports combining streams of data from various data sources such as, for example, from publicly and commercially available data sources (e.g., weather data, pollution alert data, governmental data sources, social media feeds, crime data/statistics, traffic data sources, traffic/parking regulations, etc.), information about the user from one or more IoT devices or sensors such as, for example, wearable devices or sensors, and/or from data available on-board a vehicle (e.g., proximity sensors, cameras, radio frequency identification "RFID" readers, biometric sensors, wearable sensors, driving history, charge/fuel state of car, etc.). For example, assistance detection module 350 ascertains that a car accident has occurred at a specific intersection involving two motorists resulting in assistance detection module 350 determining that the presence of agent 270 is necessary at the scene of the incident. In some embodiments, assistance detection module 350 is further configured to determine whether agent 270 needs to be a law enforcement/patrolling officer and/or an emergency medical professional (e.g., paramedics, specialist, etc.) based on the incident and the contextual information associated with the incident. For example, assistance detection module 350 may detect that medical assistance is necessary and provide mitigating actions (e.g., dispatching of ambulance or applicable robots to scene of incident, assistance/instructions from agent 270 who is a medical professional, etc.) configured to be interrelated using machine learning algorithms provided by machine learning module 340. The contextual information may be ascertained by assistance detection module 350 utilizing cognitive/analytic systems, image/video detection mechanisms, NLP/linguistic techniques, etc., in which the contextual information may include but is not limited to time, location, exclamations of motorists/pedestrians/bystanders ascertained from utterances, historical data, or any other applicable ascertainable context-based data known to those of ordinary skill in the art. For example, assistance detection module 350 may ascertain that agent 270 is required at the scene of an incident based upon detection of a bystander within the captured footage uttering "Someone call 911".

Location determination module 360 is tasked with determining a target location, perspective, angle, etc. within a virtual environment generated by augmented reality module 380 to insert the virtual representation of agent 270 at the scene of an incident. It should be noted that the target location may be manually selected by agent 270 on the centralized platform by interacting with the virtual environment (e.g., toggling, zooming, etc.) in real-time and/or based on the location identifier derived from the source of the sensor data collected by sensor system module 310 (i.e., which CCTV system captured the footage). The target location is configured to serve as an indicator of the exact position to map the insertion of the virtual representation of agent 270 resulting in the virtual representation being displayed via holographic and/or volumetric displays. Location determination module 360 is configured to adjust the target location based upon receiving and analyzing contextual information associated with perspective data derived from computing device 260 and/or road traffic data. For example, agent 270 may ascertain the optimal angle/perspective to view the incident and/or be viewed at the scene of the incident from a particular angle from computing devices 260 and 280.

Autonomous vehicle module 370 is tasked with detecting autonomous vehicles involved with incidents detected by assistance detection module 350 in order to not only convey instructions to motorists operating the autonomous vehicles, but also display the virtual representation of agent 270 via the applicable holographic and/or volumetric displays integrated within the autonomous vehicles.

Augmented reality module 380 is tasked with generating an AR-based virtual environment of the scene of an incident (e.g., a virtual reality model of the scene/environment or superimposing virtual content over a real world view of the scene in augmented reality) based on data provided by server 210, sensor system module 310, computer vision module 315, visualizations of the aforementioned mappings performed by mapping module 320, and/or publicly and commercially available data sources (e.g., weather data, pollution alert data, governmental data sources, social media feeds, crime data/statistics, traffic data sources, traffic/parking regulations, etc.). Visualizations generated by augmented reality module 380 are designed to depict agent 270 (preferably donning computing device 260, a computer-mediated reality device) at the target location for viewing by user 290 operating on the centralized platform via computing device 280, preferably a computing device including holographic and/or volumetric displays. For example, computing device 280 may be an autonomous vehicle including augmented reality functionality configured to superimpose visual content along with the virtual representation of agent 270 over views of the scene/environment of the incident. In some embodiments, augmented reality module 380 is configured to generate a graphic virtual re-creation of the incident having a marked starting location and a marked collision location associated with the computer vision model. The computer vision model can be a graphical virtual representation of a viewpoint of one or more of agent 270 at the scene of the incident, applicable motorists/pedestrians at the scene of the incident, applicable bystanders at the scene of the incident, etc. User inputs of agent 270 may be received during the visualization allowing agent 270 to manipulate the position of elements within the rendered virtual environments. The manipulation can be a translation, rotation, calling operation, zooming in/out, removal of elements, etc.

Command module 390 is tasked with detecting gestures of agent 270 based on data collected from computing device 260 and generated instructions based on the detected gestures to be performed by one or more of the motorists, pedestrians, bystanders, autonomous vehicles, and/or autonomous robots if applicable. The gestures may include, but are not limited to, utterances, physical gestures/body movements (e.g., waving, arm movements, finger movements, etc.), signaling, or any other applicable augmented reality-based interactions known to those of ordinary skill in the art. The gestures may be processed and translated into commands/instruction or the virtual representation of agent 270 may replicate the gestures in the presentation of the virtual representation displayed on the applicable holographic and/or volumetric displays. Once gestures of agent 270 are detected, command module 390 processes them in order to determine which instructions to generate for conveyance to the applicable parties at the scene of the incident. For example, upon assistance detection module 350 determining a car accident, the virtual representation of agent 270 is depicted at the scene of the accident allowing agent 270 to scope the scene. Upon their investigation of the scene, agent 270 determines that the vehicles involved need to be cleared in order to prevent further traffic congestion, in which agent 270 performs a waving gesture that is interpreted by command module 390 as an instruction to clear the roadway. The instruction is configured to be conveyed vocally and visually to the applicable parties at the accident scene; however, the instruction may be automatically transmitted to the applicable autonomous robots to assist in clearing the roadway and/or the applicable autonomous vehicle causing agent 270 to control the functionality of the autonomous vehicles (e.g., steering, lighting control, etc.).

Figure 4:
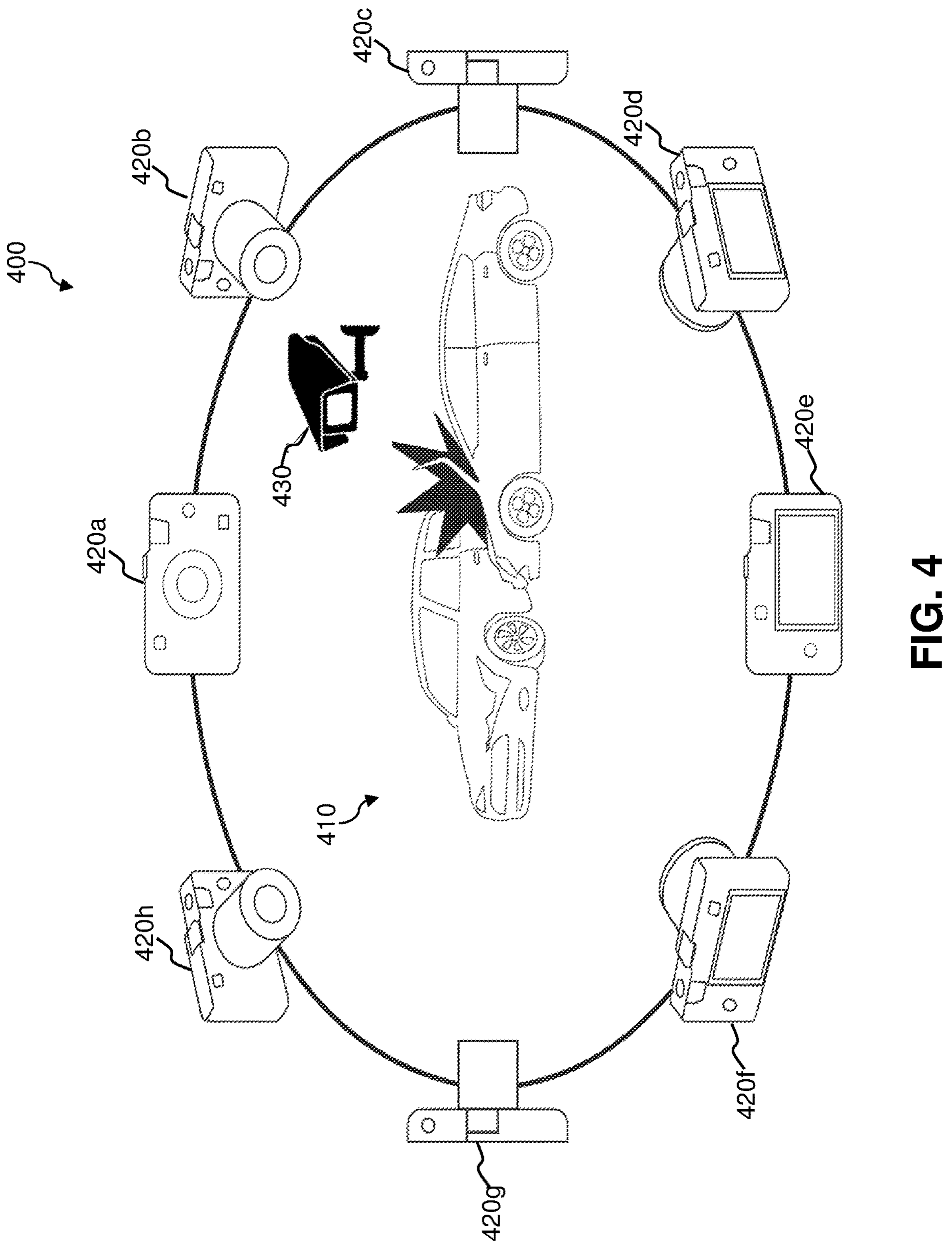
FIG. 4 illustrates a schematic diagram showing an incident scene captured by a sensor system associated with the system of FIG. 1, according to an exemplary embodiment.

Referring now to FIG. 4, an incident scene 400 is depicted, according to an exemplary embodiment. In some embodiments, incident scene 400 comprises a collision 410 of two vehicles, in which a plurality of sensors 420*a-h* and a CCTV system 430 associated with sensor system module 310 capture footage of incident scene 400 from concurrent multiple angles/perspectives. Furthermore, contextual information may be established based on footage captured by sensors 420*a-h*, such as, but not limited to, geographic/relative coordinates, direction footage was captured in (e.g., direction angle, azimuth, etc.), theme of captured footage, etc. In some embodiments, one or more of plurality of sensors 420*a-h* are camera systems of pedestrians, bystanders, crowdsourcing platforms, monitoring systems, etc. operating on applicable computing devices (e.g., mobile devices, UAVs, etc.) configured to transmit video footage of collision 410 to surveillance module 230 in order to optimize the amount and quality of perspectives of collision 410 allowing agent 270 to determine the optimal target location to insert the virtual representation. As a result of the sensor data captured by sensors 420*a-h* and CCTV system 430, augmented reality module 380 renders a three-dimensional virtual space accounting for the computer vision model and the mappings rendered by mapping module 320.

Analysis of CCTV video footage may take place at the edge of the network; thus, reducing the network bandwidth requirements since relevant footage associated with collision 410 may be sent over the network. Therefore, agent 270 may be located off-premise; however, CCTV system 430 is remotely connected to computing device 260 allowing agent 270 to initiate searches and analyses of the captured video footage. Agent 270 may initiate the searches and analyses simultaneously as augmented reality module 380 is rendering the virtual environment of incident scene 400. CCTV system 430 having an associated location identifier allows location determination module 360 to ascertain the optimal location within incident scene 400 to insert the virtual representation; however, agent 270 may navigate within the virtual environment and manually select the position to insert the virtual representation. In some embodiments, the vehicles and motorists/pedestrians involved with collision 410 may be visualized as avatars, graphical icons, and the like, in which agent 270 may interact with said visualizations via multi-touch interfaces supporting selection and manipulation of the vehicles and motorists/pedestrians. For example, agent 270 may interact with the aforementioned elements of the virtual environment in order to estimate a collision path and/or create a predicted visualization of incident scene 400 in the instance in which collision 410 has not occurred yet.

Figure 5:
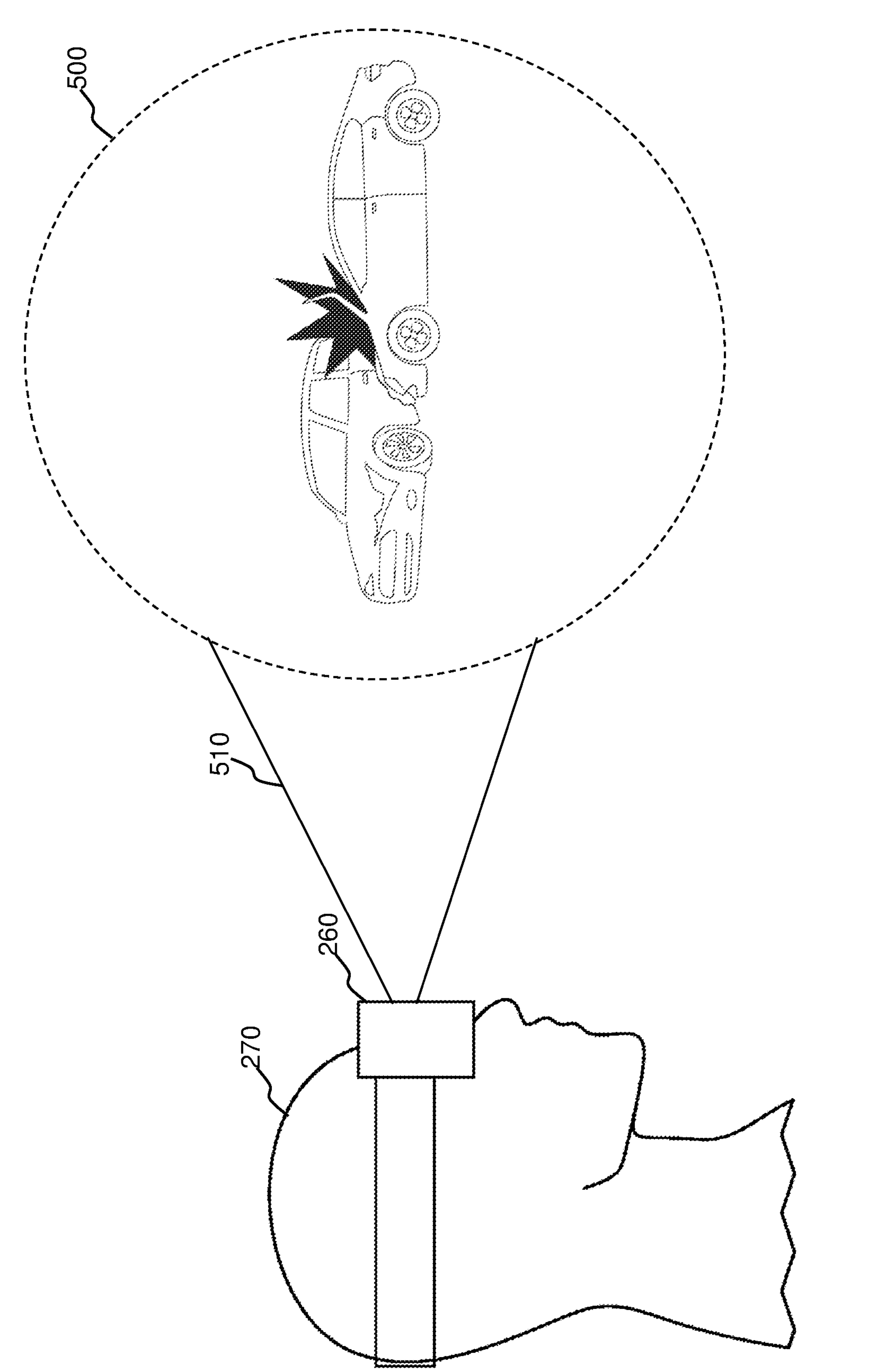
FIG. 5 illustrates a schematic diagram showing a virtual environment depicting the incident scene of FIG. 4, as viewed through a computer-mediated reality device, according to an exemplary embodiment.

Referring now to FIG. 5, an example virtual environment 500 of the collision as a depiction 510 viewed through computing device 260 (i.e., a computer-mediated reality device donned by agent 270) is illustrated, in accordance with an embodiment of the present invention. Depiction 510 illustrates the virtual environment as generated by augmented reality module 380 in which virtual environment 500 is configured to be dynamically modified in real-time based on analyses performed by one or more of surveillance module 230 and virtual assistance module 250. For example, virtual environment 500 may be overlaid on an interactive map reflecting traffic-data, weather data, etc. pertaining to the geographic area associated with the incident. Based on the assessment of the collision, agent 270 may determine whether mitigating actions are necessary in order to mitigate risk of occurrence of a possible negative impact of the incident, in which mitigating acts may include, but are not limited to, one or more of agent 270 dispatching robots to provide assistance, dispatching emergency medical professionals at the location of the incident, rendering the virtual representation for real-time presentation (e.g., on-site visual and audio instructions) of the actions of agent 270 at the target location, manipulating traffic signal lighting systems to control traffic flow, controlling operations of applicable autonomous vehicles within the vicinity of the incident, etc.

Figure 6:
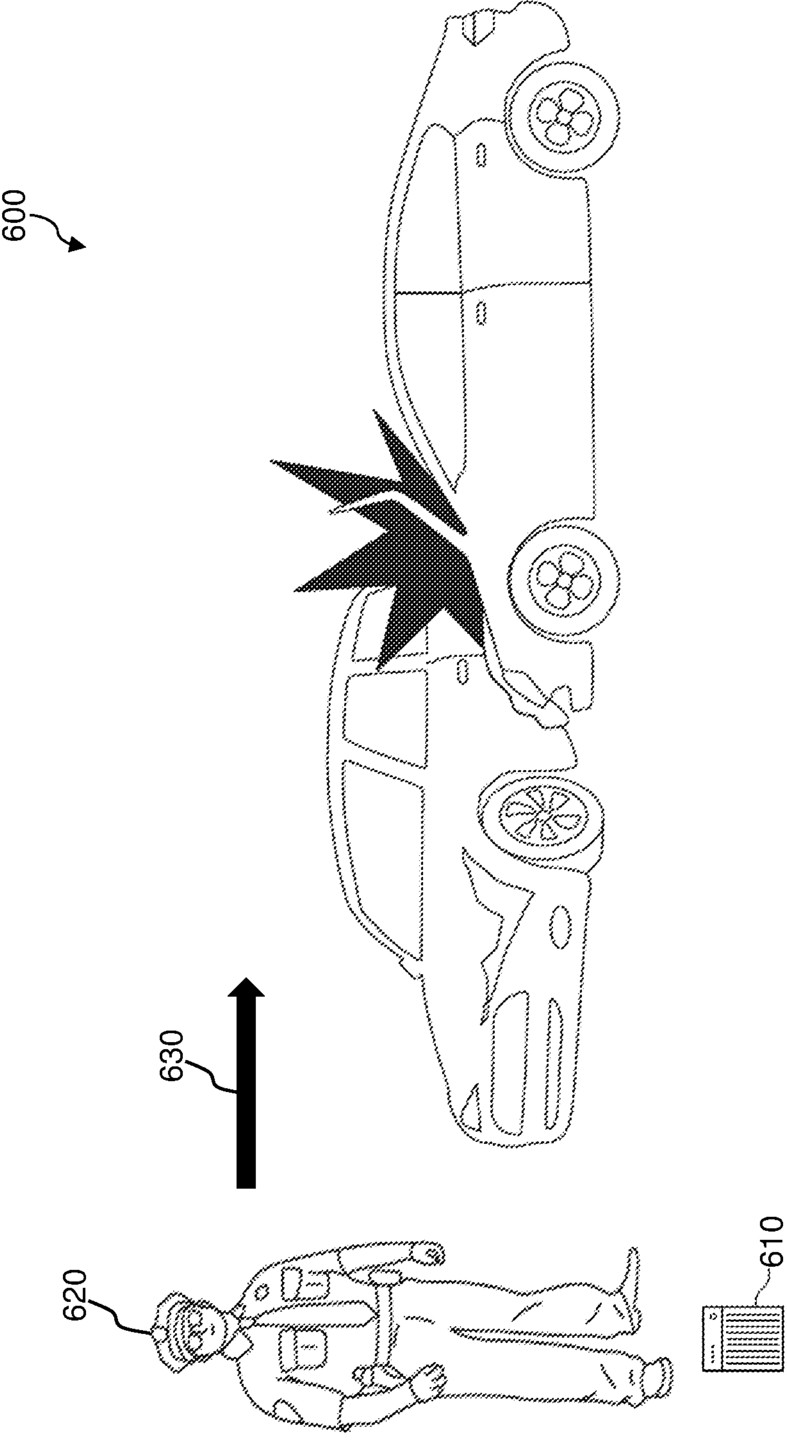
FIG. 6 illustrates a schematic diagram showing a virtual environment depicting the incident scene integrating a virtual assistance agent performing gestures, according to an exemplary embodiment.

Referring now to FIG. 6, a virtual environment 600 associated with the incident scene of the collision is depicted, in accordance with an embodiment of the present invention. Virtual environment 600 may depicted from the perspective of one or more of agent 270 operating on computing device 260, computing devices of motorists (i.e., the applicable display of the autonomous vehicles), pedestrians/bystanders (e.g., VR glasses, AR headsets, etc.), and any other applicable monitoring system. In some embodiments, an AR controller 610 associated with one or more sensors of sensor system module 310 and augmented reality module 380 is utilized to control display of holographic images and/or volumetric video to the applicable receiving computing device. However, in some embodiments, AR controller 610 is an apparatus configured to display 360-degree video, holographic video, volumetric video, and the like directly at the scene of the incident. For example, AR controller 610 may include a holographic projector with an associated external display allowing a virtual assistance agent 620 representing agent 270 to be depicted at the scene of the incident. In some embodiments, varying sized images may be portrayed by AR controller 610 allowing presentation functionalities such as picture-in-picture, split screens, and any other applicable viewing features known to those of ordinary skill in the art to be viewed via the centralized platform. For example, a first screen may depict virtual assistance agent 620 administering instructions for those at the scene of the incident paralleled to a second screen depicting a real-time flow of nearby traffic impacted by the incident.

AR controller 610 directly projects or transmits to the applicable display device images, videos, and other applicable multi-media in which the movements, utterances, etc. of agent 270 are captured by computing device 260 and manifested within virtual assistance agent 620 in an avatar-like manner. For example, virtual environment 600 may be displayed on the front windshield or side windows of the applicable autonomous vehicles. In some embodiments, agent 270 performs a plurality of gestures 630 configured to be processed into instructions for execution by one or more of the applicable autonomous vehicles, robots, motorists, pedestrians, etc. For example, one of the gestures of gestures 630 could be an arm movement to the right by agent 270 supported by the utterance "clear the road", in which virtual assistance agent 620 visualizes the gesture in virtual environment 600 and command module 390 processes and interprets the gesture as a command to clear the vehicles involved with the collision from the roadway to reduce impact on traffic by either generating the plurality of executable instructions based on gestures 630 for automated execution at one or more of the autonomous vehicles or robots, or by virtual assistance agent 620 visually and audibly presenting the executable instructions. Textual data derived from the contextual information may also be integrated into the presentation of virtual environment 600. In some embodiments, gestures 630 may also initiate the mitigating actions, which may include, but are not limited to, controlling vehicle steering or lighting mechanisms, terminating the engine of the applicable autonomous vehicles, notifying emergency responders, controlling traffic lights/traffic flow, etc. Furthermore, agent 270 via virtual assistance agent 620 may apply non-traffic related mitigating actions based on determined infractions of rules/regulation of applicable law enforcement entities including locking/unlocking of building security mechanisms, virtual barricades configured to be enforced by robots, etc.

In some embodiments, assistance detection module 350 is further configured to utilize cognitive computing to identify whether a medical event applies to the detected incident, in which agent 270 is a medical professional dispatched as virtual assistance agent 620 in order to render applicable medical attention to motorists, pedestrians, bystanders, etc. associated with the incident. Virtual environment 600 not only allows the medical professional to assess the amount of medical attention that is required at the scene of the incident, but also utilize the command features to remotely administer mitigating actions within the scope of the applicable laws. In some embodiments, agent 270 and individuals involved with the incident may interact directly with each other over the applicable display mechanism. For example, agent 270 may ask the individuals medical related questions either verbally or via text in order to optimize the quality of medical service that virtual assistance agent 620 is able to administer at the scene of the incident in real time. For example, agent 270 may utilize virtual assistance agent 620 to inquire on the incident scene regarding one or more medically-relate questions, and in some instances the medical professional may control the robots to perform medical assistance actions (e.g., check blood pressure, temperature, heartrate, etc. of motorists in the collision).

Figure 7:
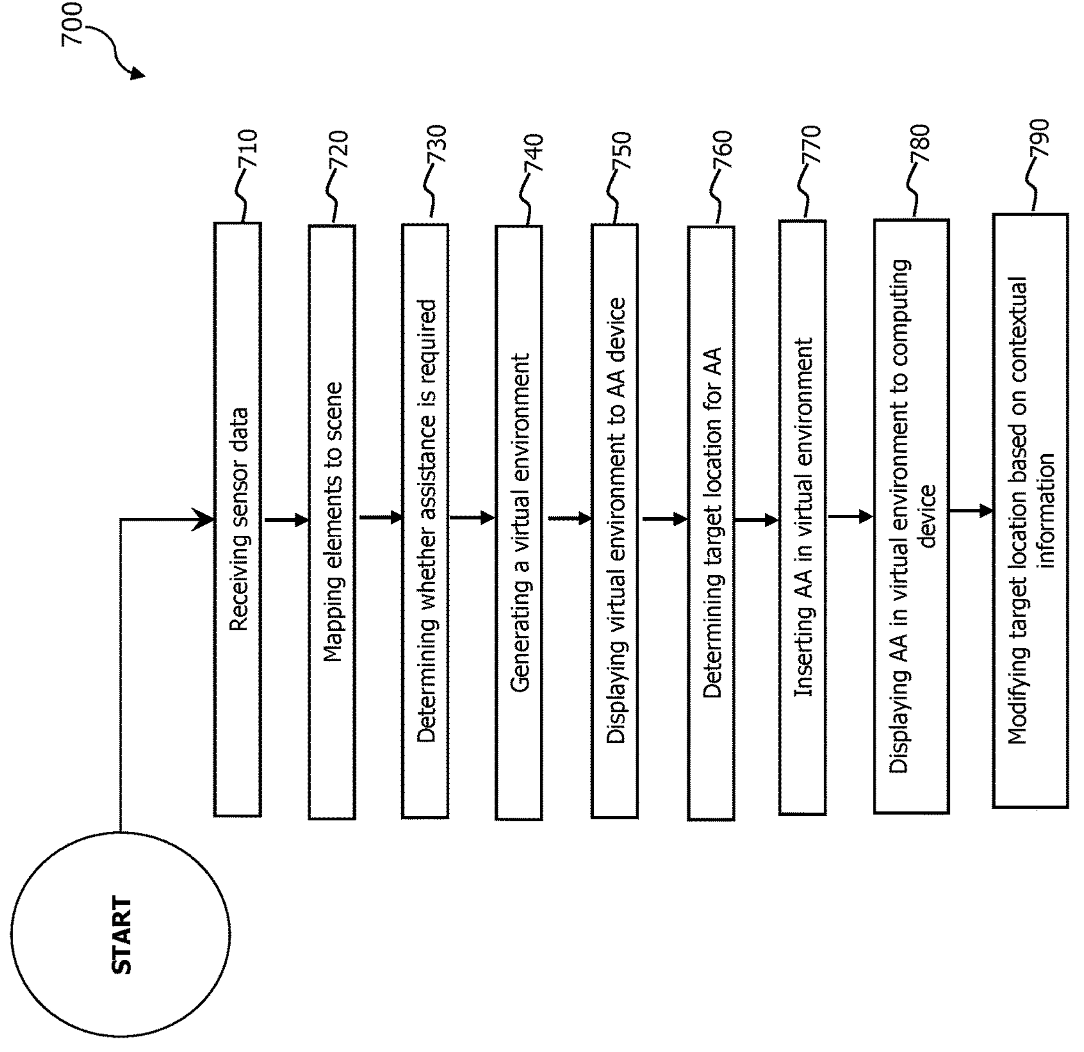
FIG. 7 illustrates a flowchart depicting a method for generating virtual assistance, according to an exemplary embodiment.

With the foregoing overview of the example architecture, it may be helpful now to consider a high-level discussion of an example process. FIG. 7 depicts a flowchart illustrating a computer-implemented process 700 for a method for generating virtual assistance, consistent with an illustrative embodiment. Process 700 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At step 710 of process 700, sensor system module 310 receives a plurality of sensor data. As previously mentioned, sensor data may include, but is not limited to, data feeds/video feeds, image data, audio data, thermal data, movement data, temperature, humidity, pressure, proximity, speed, rotation, light, gas, chemical levels, time-series data, or any other applicable data configured to be collected by sensors known to those of ordinary skill in the art. In some embodiments, sensor data is also collected by computing devices 260 & 280, and any other applicable computing devices associated with motorists, pedestrians, bystanders, etc. of the geographic area, in which the collected sensor data is transmitted to sensor system module 310 over the network.

At step 720 of process 700, mapping module 320 performs mapping of elements detected within the scene of the footage captured by sensor system module 310. Mapping functions performed by mapping module 320 may be based on one or more of data provided server 210 (e.g., contextual information, knowledge graphs, etc.), previously rendered maps of the geographic location, outputs of one or more machine learning models operated by machine learning module 340, inputs of agent 270 on user interfaces and applicable application programming interfaces provided by the centralized platform, applicable data provided by relevant third parties (e.g., law enforcement entities, weather entities, traffic data entities, etc.), and the like. Mapping module 320 is further configured to classify various areas detected with the footage of the video feeds resulting in labels being applied to elements within the geographic area. For example, mapping module 320 may utilize a classifier to label an intersection, a building, a public place, a pedestrian, etc.

At step 730 of process 700, assistance detection module 350 determines whether assistance is required based upon detection of an incident. It should be noted that various factors may be taken into consideration in order to determine whether an incident has occurred or is highly likely to occur, in which machine learning module 340 utilizes cognitive/analytical techniques to generate predictions indicating an incident or highly likelihood of an incident. For example, factors such as, but not limited to, detection of an injured individual, a formation of a group of individuals, a public hazard, audio-based data indicating a commotion, etc. Upon detection of an incident, determination of whether assistance is necessary may be based on image/video analyses performed on the captured footage and/or incident-related data collected at the site of the incident (e.g., robots detecting injuries at the geographic location, vigilance module 325 receiving reporting of an incident, etc.).

At step 740 of process 700, augmented reality module 380 generates a virtual environment. In some embodiments, the virtual environment is rendered based on the results of the analyses performed on the collected sensor data by surveillance module 230 and virtual assistance module 250 and other applicable data collected by server 210 along with metadata within surveillance module database 240 the accessed mappings within mapping module database 330. It should be noted that embodiments of the invention contemplate three-dimensional views that are presented via virtual reality, augmented reality, and/or mixed reality techniques. In some embodiments, the centralized platform provides an interactive virtual environment configured to be interacted with by user inputs of agent 270 applied to user interfaces and APIs presented to computing device 260.

At step 750 of process 700, the virtual environment is presented to computing device 260. It should be noted that one of the purposes in presenting the virtual environment to agent 270 initially is to not only allow agent 270 to investigate the scene of the incident, but also to allow agent 270 to select which perspective/angle agent 270 would like to be viewed by user 290 on computing device 280. In some embodiments, agent 270 may also provide virtual environment viewing preferences in order to configure the virtual environment, in which the viewing preferences pertain to lighting, brightness, coloring/shading, notification presentation, and the like.

At step 760 of process 700, location determination module 360 determines the target location for infusing/integrating the virtual assistance agent within the virtual environment. The target location may be determined based on various factors including, but not limited to, location identifier, the scene incident, the positioning of key elements within the incident scene (e.g., robots, motorists, pedestrians, bystanders, etc.). In some embodiments, agent 270 may manually select the target location by interacting and maneuvering the virtual environment in order to choose the optimal angle to view and be viewed.

At step 770 of process 700, the virtual assistance agent is inserted into the virtual environment. Integrating the virtual assistance agent at the target location with the virtual environment includes overlaying the virtual assistance agent over the virtual environment or integrating the virtual assistance agent into the real world environment of the incident scene.

At step 780 of process 700, the virtual assistance agent integrated into the virtual environment is displayed to computing device 280. One of the primary purposes of presenting the virtual assistance agent is to allow interaction between agent 270 and user 290 in which agent 270? is able to remotely provide assistance, instructions, commands, and the like to individuals and elements at the scene of the incident in real-time.

At step 790 of process 700, the target location is modified based on contextual data. As previously mentioned, the contextual information may include, but is not limited to, incident-specific data (e.g., type of incident, type of vehicles involved, etc.), time, location, weather, crime data, exclamations of motorists/pedestrians/bystanders ascertained from utterances, historical data, or any other applicable ascertainable context-based data known to those of ordinary skill in the art.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-payment devices or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter payment device or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method for generating virtual assistance, the method comprising:

receiving, by a computing device, a plurality of sensor data associated with a surveillance system;

generating, by the computing device, a virtual environment based on an analysis of the plurality of sensor data;

generating, by the computing device, a prediction of an incident derived from a machine learning model based on the analysis; and inserting, by the computing device, an augmented reality-based assistance agent associated with an authority communicatively coupled to the surveillance system into the virtual environment based on a mapping derived from one or more outputs of the machine learning model to provide a mitigating action to the incident;

wherein the augmented reality-based assistance agent is configured to generate a plurality of executable instructions designed to be performed by one or more autonomous robots associated with the incident.

2. The computer-implemented method of claim 1, wherein the augmented reality-based assistance agent is a law officer or medical professional configured to be virtually integrated into the virtual environment via a volumetric display.

3. The computer-implemented method of claim 1, wherein generating the virtual environment comprises:

determining, by the computing device, a target location in the virtual environment to insert the augmented reality-based assistance agent based on a location identifier derived from the plurality of sensor data.

4. The computer-implemented method of claim 3, further comprising:

modifying, by the computing device, the target location in the virtual environment to insert the augmented reality-based assistance agent based on receiving and analyzing contextual information.

5. The computer-implemented method of claim 1, wherein the plurality of sensor data is derived from at least one closed circuit TV system (CCTV) comprising one or more live video feeds associated with volumetric data.

6. The computer-implemented method of claim 1, wherein the analysis of the plurality of sensor data comprises:

determining, by the computing device, one or more of a traffic accident, an infraction, a high probability of accident, and a presence of required assistance;

wherein the determination is based on a plurality of rules defined by a law enforcement entity.

7. The computer-implemented method of claim 1, further comprising:

displaying, by the computing device, the virtual environment comprising the augmented reality-based assistance agent to one or more augmented reality systems associated with pedestrians and drivers.

8. The computer-implemented method of claim 6, wherein the augmented reality-based assistance agent is configured to generate the plurality of executable instructions designed to be performed by one or more autonomous robots associated with one or more of the traffic accident, the infraction, the high probability of accident, and the presence of required assistance;

wherein the plurality of executable instructions are generated based on one or more gestures associated with the law enforcement entity.

9. A computer program product for generating virtual assistance, the computer program product comprising one or more computer readable storage media and program instructions collectively stored on the one or more computer readable storage media, the stored program instructions comprising:

program instructions to receive a plurality of sensor data associated with a surveillance system;

program instructions to generate a virtual environment based on an analysis of the plurality of sensor data;

program instructions to generate a prediction of an incident derived from a machine learning model based on the analysis; and program instructions to insert an augmented reality-based assistance agent associated with an authority communicatively coupled to the surveillance system into the virtual environment based on a mapping derived from one or more outputs of the machine learning model to provide a mitigating action to the incident;

wherein the augmented reality-based assistance agent is configured to generate a plurality of executable instructions designed to be performed by one or more autonomous robots associated with the incident.

10. The computer program product of claim 9, wherein the program instructions to generate the virtual environment comprise:

program instructions to determine a target location in the virtual environment to insert the augmented reality-based assistance agent based on a location identifier derived from the plurality of sensor data.

11. The computer program product of claim 10, the stored program instructions further comprising:

program instructions to modify the target location in the virtual environment to insert the augmented reality-based assistance agent based on receiving and analyzing contextual information.

12. The computer program product of claim 9, wherein the program instructions to generate the virtual environment comprise:

program instructions to display the virtual environment comprising the augmented reality-based assistance agent to one or more augmented reality systems associated with pedestrians and drivers.

13. The computer program product of claim 9, wherein the analysis of the plurality of sensor data comprises:

program instructions to determine one or more of a traffic accident, an infraction, a high probability of accident, and a presence of required assistance;

wherein the determination is based on a plurality of rules defined by a law enforcement entity.

14. The computer program product of claim 9, the stored program instructions further comprising:

program instructions to display the virtual environment comprising the augmented reality-based assistance agent to one or more augmented reality systems associated with pedestrians and drivers.

15. A computer system for generating virtual assistance, the computer system comprising:

one or more processors;

one or more computer-readable memories;

program instructions stored on at least one of the one or more computer-readable memories for execution by at least one of the one or more processors, the program instructions comprising:

program instructions to receive a plurality of sensor data associated with a surveillance system;

program instructions to generate a virtual environment based on an analysis of the plurality of sensor data;

program instructions to generate a prediction of an incident derived from a machine learning model based on the analysis; and program instructions to insert an augmented reality-based assistance agent associated with an authority communicatively coupled to the surveillance system into the virtual environment based on a mapping derived from one or more outputs of the machine learning model to provide a mitigating action to the incident.

16. The computer system of claim 15, wherein the augmented reality-based assistance agent is a law officer or medical professional configured to be virtually integrated into the virtual environment via a volumetric display.

17. The computer system of claim 15, wherein the plurality of sensor data is derived from at least one closed circuit TV system (CCTV) comprising one or more live video feeds associated with volumetric data.

18. The computer system of claim 15, wherein the analysis of the plurality of sensor data comprises:

program instructions to determine one or more of a traffic accident, an infraction, a high probability of accident, and a presence of required assistance;

wherein the determination is based on a plurality of rules defined by a law enforcement entity.

19. The computer system of claim 18, wherein the augmented reality-based assistance agent is configured to generate a plurality of executable instructions designed to be performed by one or more autonomous robots associated with one or more of the traffic accident, the infraction, the high probability of accident, and the presence of required assistance;

wherein the plurality of executable instructions are generated based on one or more gestures associated with the law enforcement entity.

20. The computer system of claim 15, the stored program instructions further comprising:

program instructions to display the virtual environment comprising the augmented reality-based assistance agent to one or more augmented reality systems associated with pedestrians and drivers.

* * * * *